United States Patent
Claeys et al.

(10) Patent No.: US 10,246,622 B2
(45) Date of Patent: *Apr. 2, 2019

(54) COOLANT HAVING RAPID METAL PASSIVATION PROPERTIES

(71) Applicant: Arteco NV, Schoten (BE)

(72) Inventors: Sandra G. Claeys, Belgium (BE); Serge S. Lievens, Belgium (BE)

(73) Assignee: Arteco NV, Schoten (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/731,132

(22) Filed: Jun. 4, 2015

(65) Prior Publication Data

US 2015/0267101 A1  Sep. 24, 2015

Related U.S. Application Data

(63) Continuation of application No. 13/603,789, filed on Sep. 5, 2012, now Pat. No. 9,115,302.

(51) Int. Cl.
*C09K 5/10* (2006.01)
*C23F 11/18* (2006.01)
*C09K 5/20* (2006.01)
*C23C 22/60* (2006.01)
*C23C 22/66* (2006.01)

(52) U.S. Cl.
CPC .................. *C09K 5/10* (2013.01); *C09K 5/20* (2013.01); *C23C 22/60* (2013.01); *C23C 22/66* (2013.01); *C23F 11/181* (2013.01); *C23F 11/184* (2013.01); *C23F 11/188* (2013.01)

(58) Field of Classification Search
CPC ... C09K 5/00; C09K 5/10; C09K 5/20; C09K 8/54; C23F 11/00; C23F 11/167; C23F 11/1676; C23F 11/18; C23F 11/181; C23F 11/187; C23F 11/188
USPC .......................... 252/70, 71, 73, 74, 75, 78.5
See application file for complete search history.

(56) References Cited

U.S. PATENT DOCUMENTS

| | | | |
|---|---|---|---|
| 3,699,052 A | | 10/1972 | Petrey et al. |
| 4,414,126 A | * | 11/1983 | Wilson .................. 252/78.3 |
| 4,452,715 A | | 6/1984 | Hirozawa |
| 4,557,896 A | * | 12/1985 | Brocklebank et al. ......... 422/14 |
| 4,587,028 A | | 5/1986 | Darden |
| 4,606,890 A | | 8/1986 | Fisk |
| 4,626,367 A | * | 12/1986 | Kuwamoto et al. .......... 508/156 |
| 4,647,392 A | | 3/1987 | Darden et al. |
| 4,759,864 A | | 7/1988 | Van Neste et al. |
| 4,851,151 A | | 7/1989 | Najjar et al. |
| 5,076,951 A | * | 12/1991 | Miles et al. .................... 252/79 |
| 5,366,651 A | | 11/1994 | Maes et al. |
| 5,454,967 A | | 3/1995 | Pfitzner et al. |
| 5,718,836 A | * | 2/1998 | Nakatani et al. ............... 252/74 |
| 6,228,283 B1 | * | 5/2001 | Turcotte et al. ................ 252/76 |
| 6,508,951 B1 | * | 1/2003 | Mori et al. ..................... 252/73 |
| 6,878,309 B2 | | 4/2005 | Blakemore et al. |
| 7,258,814 B2 | * | 8/2007 | Egawa et al. ................... 252/76 |
| 2004/0227124 A1 | | 11/2004 | Turcotte et al. |
| 2005/0062015 A1 | | 3/2005 | Kobori |
| 2006/0237685 A1 | | 10/2006 | Egawa et al. |
| 2006/0237686 A1 | | 10/2006 | Egawa et al. |
| 2006/0273283 A1 | | 12/2006 | Egawa et al. |
| 2007/0096054 A1 | | 5/2007 | Egawa et al. |
| 2009/0045379 A1 | | 2/2009 | Pellet |
| 2010/0059703 A1 | | 3/2010 | Yang et al. |
| 2010/0116473 A1 | | 5/2010 | Yang et al. |
| 2012/0216834 A1 | | 8/2012 | Yang et al. |

FOREIGN PATENT DOCUMENTS

| | | |
|---|---|---|
| EP | 1081250 A1 | 3/2001 |
| EP | 1122290 A1 | 8/2001 |
| JP | 2002294227 A | 10/2002 |
| JP | 2005187748 A | 7/2005 |
| WO | 2005054399 A1 | 6/2005 |

* cited by examiner

*Primary Examiner* — Jane L Stanley
(74) *Attorney, Agent, or Firm* — Melissa M. Hayworth; E. Joseph Gess

(57) ABSTRACT

It has been found that the chemical reactivity of the metal surface of heat exchangers with coolants in presence of nitrites can be reduced by the addition of additives such as phosphonates or phosphinates. Aluminum, other Group III metals, as well as other metals commonly used in cooling systems, such as those of automobile engines, may thus be effectively protected.

22 Claims, No Drawings

COOLANT HAVING RAPID METAL PASSIVATION PROPERTIES

CROSS-REFERENCE TO RELATED APPLICATIONS

This application is a continuation of U.S. application Ser. No. 13/603,789 filed Sep. 5, 2012, entitled "Coolant Having Rapid Metal Passivation Properties", the contents of which are incorporated herein by reference in their entirety.

FIELD OF THE INVENTION

This invention is directed to nitrite containing coolant formulations that provide long lasting corrosion protection for the surfaces of lightweight metals used in modern cooling system designs.

BACKGROUND OF THE INVENTION

Coolants (heat transfer solutions) are used to remove heat from engines, particularly in combustion engines of the automotive industry. In order to provide optimal efficiency to the engine, excess heat should be removed as quickly as possible without damaging or decreasing the operation of all cooling system parts. Much progress has been made towards the protection of the cooling system materials especially in the area of protection (passivation) against corrosion at high temperatures. Although, from a corrosion standpoint temperatures close to boiling are indeed very critical, the low temperature domain is also of high importance during engine operation. At temperature below the freezing point, not the corrosion protection but the solubility and low temperature pumpability is of major importance.

Ideally the coolant remains transparent and free of insoluble materials. Haziness, precipitation, or in extremes, gel formation are considered detrimental for the performance of an engine coolant. Deposit formation, on the one hand, will result in abrasive conditions and will physical damage soft materials in the cooling system. Problems resulting from instability can be seen in water pump seals, engine head seals, hoses or any other parts where softer materials are in use. Gel formation, on the other hand will have a negative impact on the viscosity and results in a negative change of the heat transfer characteristics of the fluid and can be observed in the heat exchangers of the cooling system.

In both heavy duty and off highway applications, the use of nitrite alone and in the combination with molybdate is still widespread for the protection of an engine's ferrous wet sleeve liner from cavitation. The use of such coolant formulations containing nitrite is widely spread in the United States, since many fleet and truck owners as well as the Truck Maintenance Council (TMC) have published recommended practice guidelines. TMC publishes the Recommended Practices Manual. This comprehensive manual contains more than 250 Recommended Practices (RPs). A Recommended Practice is a specification or practice, the adoption of which is voluntary. It is used to assist fleets and equipment manufacturers in the purchase, design, maintenance and performance of their equipment. TMC issues two types of RPs: Recommended Maintenance Practices, and Recommended Engineering Practices, Recommended Maintenance Practices are voluntary practices that assist equipment users, vehicle/component manufacturers, and other industry suppliers in the maintenance of commercial vehicle equipment. They also include informational documents that cover technical aspects of maintenance, equipment and supporting technologies. Recommended Engineering Practices are voluntary practices that assist equipment users, vehicle/component manufacturers, and other industry suppliers in the design, specification, construction and performance of commercial vehicle equipment.

Until a clear and differentiating test method exists that can provide guarantee for the protection against cavitation, a coolant which contains nitrite remains recommended to guarantee sufficient protection of the liners. The applicable recommended practice guideline is RP329, Fleet Purchasing Specification for Nitrite-Containing Ethylene Glycol Base Coolant. This Recommended Practice specifies requirements for concentrated and predituted forms of fully-formulated ethylene glycol base antifreeze/coolant which does not require a precharge of supplemental coolant additives.

If a coolant formulation contains nitrite in the ranges set forth as follows, it is acceptable for wet liner cavitation protection to Original Equipment Manufacturers. This is based on the historically positive observations and conclusions that nitrite has shown over decades of its capability of providing ferrous alloys protection from cavitation damage.

Concentrated antifreeze w/coolant must contain either: A. at least 2400 ppm nitrite (as $NO_2^-$); or B. a combined total of at least 1560 ppm nitrite (as $NO_2^-$) plus molybdate (as $MoO_4^{2-}$); with a minimum of 600 ppm of either.

Predituted antifreeze/coolant must contain either: A. at least 1200 ppm nitrite (as $NO_2^-$) or B. a combined total of at least 780 ppm nitrite (as $NO_2^-$) plus molybdate (as $MoO_4^{2-}$); with a minimum of 300 ppm of either.

In today's engine applications, large amounts of lightweight, Group III metals such as aluminum and its alloys are used as an alternative to other metals such as cast iron, copper, solder, brass, steel, magnesium, and their alloys in the construction of different components. Modern heat exchangers and water pumps are the best known examples of such components. There is particular interest in aluminum due to its lower weight combined with acceptable strength and efficient heat transfer properties.

In order to protect the cooling system and engine parts against corrosion, an additive package containing corrosion inhibitors is generally added to the coolant base fluid. Various corrosion inhibitors have been added to water/alcohol based coolants and heat transfer fluids to reduce corrosion of metallic systems. Carboxylate corrosion inhibitor combinations are well known, e.g. non-silicate antifreeze formulations containing alkali metal salts of benzoic acid, dicarboxylic acids and nitrate. Alternately, corrosion inhibitors comprising the combination of an aliphatic monoacid or salt, a hydrocarbyl dibasic acid or salt and a hydrocarbyl triazole are also known. A corrosion inhibitor using an alkylbenzoic acid salt, an aliphatic monoacid or salt and a hydrocarbyl triazole has also been disclosed, as have phosphate and nitrite free antifreeze formulations containing aliphatic monobasic acids or salts, an alkali metal borate compound and a hydrocarbyl triazole. Antifreeze compositions containing an aliphatic monoacid or salt, a hydrocarbonyl triazol and imidazol have also been described.

The addition of phosphonocarboxylates to coolants as a corrosion inhibitor in combination with inorganic phosphates, is known, combinations of phosphonocarboxylates and strontium or magnesium or calcium compounds were explored but are limited to the use of phosphonate 2-phosphonobutane-1,2,4-tricarboxylic acid or a salt thereof.

Recently, fast depletion of certain corrosion inhibitors such as nitrites, and silicates, has been observed in the field, together with an important pH increase. Those changes to the coolant can have a negative effect on its stability and long term performance. Test work conducted has indicated that these coolant changes occur in different type of heat exchangers, with both brazed and unbrazed surfaces. The changes observed in the coolant can be explained by the known chemical reaction of nitrites with unpassivated metals, such as aluminum, in the presence of sodium hydroxide. This results in the formation of ammonia and aluminum oxides and with a pH increase as result.

Earlier studies have indicated that reduction of nitrites and pH increase in the coolant could be inhibited by pre-washing the brazed surfaces of metals such as aluminum with a phosphate solution, neutral to slight alkaline, prior to contact with the coolant.

Because nitrite containing coolants are still widely used, certainly in the U.S. market, a need is present for nitrite containing coolant formulations that also provide long lasting corrosion protection for the increased aluminum surfaces in modern cooling system designs.

SUMMARY OF THE INVENTION

It has been found that the chemical reactivity of the metal surface with coolants in presence of nitrites and without inorganic phosphates can be reduced by addition of certain additives. Coolant formulations comprising following additives allow for a fast passivation of the metal despite the presence of nitrites Ammonia formation and corresponding increase of pH is suppressed:

Compounds providing fast passivation include: phosphonates with formula R—$[CR_2]_m$—$PO_3M_2$ wherein at least one R-group is a hydrogen, alkyl, alkenyl, hydroxyl, phosphono group, CO, amino, alkylamino or R is part of an aryl group. The other R groups may be the same as or different from the first R group is a hydrogen, alkyl, alkenyl, hydroxyl, phophono group, CO, amino, alkylamino, m is 1 or an integer greater than 1, and each M is hydrogen or an alkali metal ion.

Additional compounds include: phosphinates with formula R—$[CR_2]_m$$P(O_2M)H$ (wherein at least one R-group is a hydrogen, alkyl alkenyl, hydroxyl, phosphino group, CO, amino, alkylamino or R is part of an aryl group, the other R groups may be the same as or different from the first R group is a hydrogen, alkyl, alkenyl, hydroxyl, phosphono group, CO, amino, alkylamino, m is 1 or an integer greater than 1, and M is hydrogen or an alkali metal ion.

It has also been found that phosphonocarboxylates in nitrite containing coolants are much less effective in suppressing the nitrite depletion reaction and the resulting pH increase in comparison with the phosphonate technologies described in this invention.

DETAILED DESCRIPTION OF THE INVENTION

This invention is directed to a heat transfer solution which results in rapid passivation when placed in contact with metal surfaces such as aluminum, and the process of passivating such metals with the solution. This solution is composed of a fluid comprising water, alcohol or a mixture of both. This solution further comprises nitrites, at least 1% of an organic corrosion inhibitor organic salt thereof, and at least one component selected out of groups of phosphonates and phosphinates.

The water-soluble liquid alcohols useful in this invention may comprise monohydroxy lower alkyl alcohols and liquid polyhydroxy alcohols such as the alkylene and dialkylene glycols. They may also comprise alkylene glycols, glycol monoethers, glycerins and mixtures thereof. Specific examples of the alcohol contemplated herein are methanol, ethanol, propanol, isopropanol, butanol, ethylene glycol, diethylene glycol, propylene glycol, butylene glycol and mixtures thereof. A preferred glycol is ethylene glycol, which as sold commercially often contains a small amount, up to 5% by weight, of diethylene glycol. The term ethylene glycol as used herein is intended to include either the pure or commercial compound. This is also true of the other freezing point depressant alcohols contemplated herein.

The phosphonates have the formula R—$[CR_2]m$-$PO_3M_2$ (wherein at least one R-group is a hydrogen, alkyl, alkenyl, hydroxyl, phosphono group, CO, amino, alkylamino or R is part of an aryl group, the other R groups may be the same as or different from the first R group is a hydrogen, alkyl, alkenyl, hydroxyl, phophono group, CO, amino, alkylamino, m is 1 or an integer greater than 1, and each M is hydrogen or an alkali metal ion.

The phosphinates have the formula R—$[CR_2]m$-P$(O_2M)H$ (wherein at least one R-group is a hydrogen, alkyl, alkenyl, hydroxyl, phosphino group, CO, amino, alkylamino or R is part of an aryl group, the other R groups may be the same as or different from the first R group is a hydrogen, alkyl, alkenyl, hydroxyl, phosphono group, CO, amino, alkylamino, m is 1 or an integer greater than 1, and M is hydrogen or an alkali metal ion combinations of two or more of these phosphonates and/or phosphinates.

The heat transfer fluids described above can further comprise one or more alkaline earth metal (Group II of the periodic table of elements) compounds such as magnesium and/or strontium.

The heat transfer fluid described above can further comprise corrosion inhibitors selected from the group consisting of silicates, molybdates, nitrates, azoles and a combination of the foregoing compounds.

EXAMPLES

The positive effect towards fast passivation and reduced nitrite consumption has been illustrated on controlled atmosphere brazed (CAB) aluminum heat exchanger material immersed in a cooling fluid.

Description of the Test

Aluminum radiator cube material is immersed in 275 ml of a 50/50 coolant dilution (50% water and 50% coolant concentrate) in deionized water in a closed flask at 100° C. for 10 days. After the test, the nitrite concentration in the coolant is determined, together with the change in pH.

One can observe that multiple additives can provide a positive effect on pH stability or stability of the nitrite concentration but the solution of this invention gives very good results for both characteristics. Moreover, it can be observed that the selection of the correct phosphonate or phosphinate, respectively is critical to obtain a good performance level. The use of other phosphonates like the ones put forward in the prior art literature (e.g. phosphonocarboxylates as described in patent application US2010116473) does not give the targeted stability of pH, nor does it stop the consumption of nitrite.

In one embodiment, there is provided an antifreeze composition comprising from 50 to 99.8 wt. % of a glycol-based freezing point depressant selected from the group of: alkylene glycols, glycol monoethers, glycerins, and mixtures thereof 0.01 to 1 wt. % of sodium nitrite. From 0.0001 to 1% of a phosphonate with formula R—[CR$_2$]$_m$—PO$_3$M$_2$ and from 1 to 5% of an organic corrosion inhibitor or a salt thereof.

In a second embodiment, there is provided an antifreeze composition comprising from 50 to 99.8 wt % of a glycol-based freezing point depressant selected from the group of: alkylene glycols, glycol monoethers, glycerins and mixtures thereof; 0.01 to 1 wt % of sodium nitrite. From 0.0001 to 1% of a phosphonate with formula R—[CR$_2$]$_m$—PO$_3$M$_2$. From 0.0001 to 0.1 wt % of alkaline earth metal (Group II of the periodic table of elements) compounds and from 1 to 5% of an organic corrosion inhibitor or a salt thereof.

In a third embodiment there is provided an antifreeze composition as described in previous embodiments but in which the phosphonates are replaced with 0.0001 to 1% of a phosphinate with formula R—[CR$_2$]m-P(O$_2$M)H.

Examples of the described embodiments are given in the attached table (Ex. 1-6).

| Component | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 |
|---|---|---|---|---|---|---|---|---|---|---|
| mono ethylene glycol | 94.0855 | 94.0255 | 94.1209 | 94.0609 | 94.1232 | 94.0632 | 94.0009 | 94.1430 | 94.1130 | 94.0930 |
| 2-ethylhexanoic acid | 3.2400 | 3.2400 | 3.2400 | 3.2400 | 3.2400 | 3.2400 | 3.2400 | 3.2400 | 3.2400 | 3.2400 |
| Sebacic acid | 0.2520 | 0.2520 | 0.2520 | 0.2520 | 0.2520 | 0.2520 | 0.2520 | 0.2520 | 0.2520 | 0.2520 |
| Tolyltriazole | 0.2000 | 0.2000 | 0.2000 | 0.2000 | 0.2000 | 0.2000 | 0.2000 | 0.2000 | 0.2000 | 0.2000 |
| NaOH[1] | 2.0000 | 2.0000 | 2.0000 | 2.0000 | 2.0000 | 2.0000 | 2.0000 | 2.0000 | 2.0000 | 2.0000 |
| NaNO$_2$ | 0.1650 | 0.1650 | 0.1650 | 0.1650 | 0.1650 | 0.1650 | 0.1650 | 0.1650 | 0.1650 | 0.1650 |
| Sr(NO$_3$)$_2$ | | 0.0600 | | 0.0600 | | 0.0600 | 0.0600 | | 0.0300 | |
| Dequest 2010[2] | 0.0575 | 0.0575 | | | | | | | | |
| Phenylphosphonic acid | | | 0.0221 | 0.0221 | | | 0.0221 | | | |
| Phenylphosphinic acid | | | | | 0.0198 | 0.0198 | | | | |
| Dequest 7000[3] | | | | | | | | | | 0.0500 |
| Sodium molybdate dihydrate | | | | | | | 0.0600 | | | |
| pH before test | 8.6 | 8.7 | 8.6 | 8.6 | 8.6 | 8.6 | 8.6 | 8.5 | 8.5 | 8.5 |
| pH after test | 8.8 | 8.8 | 8.9 | 8.8 | 9.0 | 8.8 | 8.7 | 9.3 | 9.1 | 9.2 |
| pH change | 0.2 | 0.1 | 0.3 | 0.2 | 0.4 | 0.2 | 0.1 | 0.8 | 0.6 | 0.7 |
| NO$_2$ (%)[4] | 6 | 4 | 18 | 14 | 23 | 15 | 11 | 39 | 39 | 39 |

[1]NaOH: 50 wt % aqueous solution of sodium hydroxide
[2]Dequest 2010: 60 wt % 1-Hydroxyethylidene -1,1,-diphosphonic acid aqueous solution, commercially available at Thermphos
[3]Dequest 7000: 50 wt % of 2-phosphonobutane-1,2,4-tricarboxylic acid aqueous solution, commercially available at Thermphos
[4]% percentage of nitrites depleted after test Comparative examples 1-3 of the Table illustrate the potential negative effect of nitrites in coolants (nitrite depletion and pH increase) without the extra addition of additives described in the claims of this invention. Comparison of Comparative Examples 1-3 with Examples 1-6 demonstrates that with the addition of strontium nitrate, pH change and nitrite depletion is even further reduced.

Additionally to above critical additives also other typical coolant additives can be added comprising but not limited to the group of silicates, molybdates, nitrates, azoles, pH buffers, hard water stabilizers, antifoam agents, colorants.

In one embodiment, the composition is used as a concentrate in a mixture with an aqueous antifreeze solution comprising 10 to 90 wt. % by weight of water.

What is claimed is:
1. A heat transfer solution which provides passivation when placed in contact with metal surfaces, said solution comprising:
   (a) water, an alcohol, or a mixture of both;
   (b) from 0.01 to 1 wt % of a nitrite;
   (c) from 0.0001 to 1 wt % of a phosphonate or a phosphinate,
      the phosphonate having the formula R—[CR$_2$]$_m$—PO$_3$M$_2$ wherein each R-group is selected from the group consisting of hydrogen, alkyl, alkenyl, hydroxyl, phosphono group, carbonyl group, amino, alkylamino and an aryl group, wherein m is 1 or an integer greater than 1, and each M is hydrogen or an alkali metal ion;
      the phosphinate having the formula R—[CR$_2$]$_m$—P(O$_2$M)H wherein each R-group is selected from the group consisting of hydrogen, alkyl, alkenyl, hydroxyl, phosphino group, carbonyl group, amino, alkylamino and an aryl group, wherein m is 1 or an integer greater than 1, and M is hydrogen or an alkali metal ion;
   (d) an alkaline earth metal compound; and
   (e) a corrosion inhibitor selected from the group consisting of 2-ethylhexanoic acid, sebacic acid, and mixtures thereof,
   wherein the heat transfer solution is free of inorganic phosphates.

2. The solution of claim 1, wherein the alcohol is water soluble.

3. The solution of claim 2, wherein the water soluble alcohol is selected from the group consisting of methanol, ethanol, propanol, ispropanol, butanol, glycols, glycol monoethers, glycerins and mixtures thereof.

4. The solution of claim 3, wherein the glycol is selected from the group consisting of ethylene glycol, diethylene glycol, propylene glycol, butylene glycol and mixtures thereof.

5. The solution of claim 4, wherein the glycol is ethylene glycol.

6. The solution of claim 1, wherein the solution further comprises a corrosion inhibitor salt which is selected from the group consisting of silicates, molybdates, nitrates, azoles and combinations thereof.

7. The solution of claim 1, which comprises from 50 to 99.8 wt % of the liquid of (a).

8. The solution of claim 1, wherein the nitrite is sodium nitrite.

9. The solution of claim 1 which further comprises additives selected from the group consisting of pH buffers, hard water stabilizers, antifoam agents, and colorants.

10. The solution of claim 1, wherein the alkaline earth metal compound is a strontium or magnesium compound.

11. The solution of claim 1, wherein the alkaline earth metal compound comprises strontium nitrate and (c) is a phosphonate which comprises 1-hydroxyethylidene-1,1-diphosphonic acid or phenylphosphonic acid.

12. The solution of claim 1, wherein (c) is a phosphonate and comprises 1-hydroxyethylidene-1,1-diphosphonic acid or phenylphosphonic acid.

13. A process for passivation of metal surfaces, wherein the surfaces are treated with a solution comprising: (a) a liquid selected from the group consisting of water, an alcohol, and mixtures thereof; (b) from 0.01 to 1 wt % of a nitrite; (c) from 0.0001 to 1 wt % of: a phosphonate having the formula $R—[CR_2]_m—PO_3M_2$ wherein each R-group is selected from the group consisting of hydrogen, alkyl, alkenyl, hydroxyl, phosphono group, carbonyl group, amino, alkylamino and an aryl group, wherein m is 1 or an integer greater than 1, and each M is hydrogen or an alkali metal ion; or a phosphinate having the formula $R—[CR_2]_m—P(O_2M)H$ wherein each R-group is selected from the group consisting of hydrogen, alkyl, alkenyl, hydroxyl, phosphino group, carbonyl compound, amino, alkylamino and an aryl group, wherein m is 1 or an integer greater than 1, and M is hydrogen or an alkali metal ion; (d) an alkaline earth metal compound; and (e) a corrosion inhibitor selected from the group consisting of 2-ethylhexanoic acid, sebacic acid, and mixtures thereof, wherein the solution is free of inorganic phosphates.

14. The process of claim 13, wherein the solution further comprises a corrosion inhibitor salt selected from the group consisting of silicates, molybdates, nitrates, azoles and combinations thereof.

15. The process of claim 13, wherein the alkaline earth metal compound comprises strontium nitrate and (c) is a phosphonate and comprises 1-hydroxyethylidene-1,1-diphosphonic acid or phenylphosphonic acid.

16. The process of claim 13, wherein (c) is a phosphonate and comprises 1-hydroxyethylidene-1,1-diphosphonic acid or phenylphosphonic acid.

17. A heat transfer solution which provides passivation when placed in contact with metal surfaces, said solution comprising:
(a) water, an alcohol, or a mixture of both;
(b) from 0.01 to 1 wt % of a nitrite;
(c) from 0.0001 to 1 wt % of a phosphonate having the formula $R—[CR_2]_m—PO_3M_2$ wherein each R-group is selected from the group consisting of hydrogen, alkyl, alkenyl, hydroxyl, phosphono group, carbonyl group, amino, alkylamino and an aryl group, wherein m is 1 or an integer greater than 1, and each M is hydrogen or an alkali metal ion; or a phosphinate having the formula $R—[CR_2]_m—P(O_2M)H$ wherein each R-group is selected from the group consisting of hydrogen, alkyl, alkenyl, hydroxyl, phosphino group, carbonyl group, amino, alkylamino and an aryl group, wherein m is 1 or an integer greater than 1, and M is hydrogen or an alkali metal ion;
(d) an alkaline earth metal compound; and
(e) a corrosion inhibitor,
wherein the heat transfer solution is free of inorganic phosphates.

18. The solution of claim 17, wherein the solution further comprises a corrosion inhibitor salt which is selected from the group consisting of silicates, molybdates, nitrates, azoles and combinations thereof.

19. The solution of claim 17, which comprises from 50 to 99.8 wt % of the liquid of (a).

20. The solution of claim 17, wherein the corrosion inhibitor comprises the combination of an aliphatic monoacid or salt, a hydrocarbyl dibasic acid or salt and a hydrocarbyl triazole.

21. The solution of claim 20, wherein the corrosion inhibitor is selected from the group consisting of 2-ethylhexanoic acid, sebacic acid, tolyltriazole and mixtures thereof.

22. A heat transfer solution which provides passivation when placed in contact with metal surfaces, said solution comprising:
(a) water, an alcohol, or a mixture of both;
(b) from 0.01 to 1 wt % of a nitrite;
(c) from 0.0001 to 1 wt % of a phosphonate having the formula $R—[CR_2]_m—PO_3M_2$ wherein each R-group is selected from the group consisting of hydrogen, alkyl, alkenyl, hydroxyl, phosphono group, carbonyl group, amino, alkylamino and an aryl group, wherein m is 1 or an integer greater than 1, and each M is hydrogen or an alkali metal ion; or a phosphinate having the formula $R—[CR_2]_m—P(O_2M)H$ wherein each R-group is selected from the group consisting of hydrogen, alkyl, alkenyl, hydroxyl, phosphino group, carbonyl group, amino, alkylamino and an aryl group, wherein m is 1 or an integer greater than 1, and M is hydrogen or an alkali metal ion;
(d) an alkaline earth metal compound; and
(e) a corrosion inhibitor selected from the group consisting of 2-ethylhexanoic acid, sebacic acid, and mixtures thereof.

* * * * *